Dec. 25, 1956  H. DORMITZER ET AL  2,775,668
THERMO-ELECTRIC RELAYS
Filed April 8, 1953  2 Sheets-Sheet 1

INVENTORS
HENRY DORMITZER
WILLIAM S. H. HAMILTON
BY
HIS ATTORNEYS

Dec. 25, 1956  H. DORMITZER ET AL  2,775,668
THERMO-ELECTRIC RELAYS
Filed April 8, 1953  2 Sheets-Sheet 2

INVENTORS
HENRY DORMITZER
WILLIAM S. H. HAMILTON
BY
Pennie, Edmonds, Morton,
Barrows and Taylor
HIS ATTORNEYS United States Patent Office 2,775,668
Patented Dec. 25, 1956

2,775,668

THERMO-ELECTRIC RELAYS

Henry Dormitzer, Cambridge, Mass., and William S. H. Hamilton, Larchmont, N. Y.

Application April 8, 1953, Serial No. 347,544

2 Claims. (Cl. 200—122)

This invention relates to certain new and useful improvements in thermo-electric relays for controlling electric circuits, particularly where controlling actions are to be performed to activate or deactivate an electric circuit or an instrument arranged therein a predetermined time after a line circuit is closed to supply current to said circuit or instrument and then maintain the circuit or instrument in activated or deactivated condition until the supply of current from the line is cut off.

The general object of the invention is to provide a relay of this type embodying thermostatic or thermally responsive means for initiating and effecting a first control action within a normal given period of time after the line circuit is closed, and embodying electromagnetic means operating, if and when the first control action is completed, to effect the second control action and maintain such action effective and keep it effective and the thermally responsive means inoperative or out of action as long as the line circuit is closed and until the line current is positively cut off. This relay desirably and preferably includes a mechanical interlocking device controlled by the electromagnetic means, when the latter is energized, to engage and hold a part of the thermally responsive means out of action while permitting said thermally responsive means to cool off in readiness for an immediate control action when the line supply current is cut off and then within a short period thereafter again let on. The relay is also one of a unitary type in which its component parts are included in a can or casing having plug-in terminal contact pins or their equivalent to fit within a receiving fixture socket to connect the circuit to be controlled thereby with the line.

A relay having the characteristic features above described may be used for controlling various circuits and types of instruments, including fluorescent lamps and other space discharge circuits in which it may be employed as a starter, and other circuits for which a plug-in type of relay contained in an enclosing casing is used. Such enclosed relays, however, as ordinarily constructed, are liable to be variable and unsatisfactory or unreliable in action due to ambient temperature changes affecting the operation of its thermally responsive means as a result of climatic changes or the action of the device or instrument controlled by the relay, especially if the relay is mounted closely adjacent to the device controlled so as to be influenced by a temperature rise of the device during operation.

Another object of the present invention, therefore, is to provide a construction of relay which effectually takes care of and compensates for such ambient temperature changes to insure a reliable action of the relay within wide ambient temperature ranges, due to climatic conditions as well as working conditions of the relay.

In the accompanying drawings, forming a part of this specification,

Figs. 1 to 4 inclusive, are vertical sectional elevations of a relay embodying our invention, showing the parts in normal position;

(The above described detail views show the conditions before current has been applied to the heater.)

Figure 14:
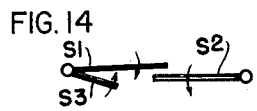

Fig. 14 is a detail view showing the relative movements between the main and the auxiliary reeds with increasing ambient temperatures.

Referring now more particularly to Figs. 1 to 7, inclusive of the drawings, showing one form of construction of the relay TER for practical use, A designates the enclosing can or casing of the relay which may be of conventional form and of sheet metal and comprises a body portion closed at its top and open at its bottom to receive a removable closure plate or disk A' secured in position by bendable tongues a or the like. The plate or disk A' serves as a base support for the parts of the relay structure per se which are unitarily applicable to and removable from the casing A with the plate or disk A' when the tongues a are bent outward to releasing position. The plate or disk A' carries a required number of contact terminal prongs, four of which denoted 1–4 inclusive, are employed in the present instance for detachably connecting the relay unit with the contacts of a suitable receiving socket, and therethrough with the terminals B. W. of a line circuit source of current supply.

Fixedly secured to the base plate or closure disk A' and extending upwardly therefrom is an upright insulated supporting plate A'', on which are directly mounted the working parts of the relay and the wiring connections between the same and the contact terminals 1–4. The relay is herein exemplificatively shown in Figs. 8 to 11, inclusive, to control the flow of current from the supply source to a contactor and a current limiting resistance, in which it establishes two circuits, to wit, a first or starting circuit excluding the resistance through which it supplies current from the line to the contactor coil for a predetermined period of time, and a second or operating circuit which is established at the end of such period of time to insert the resistance in series with the contactor coil for a running action as long as the line circuit remains closed. The relay will, therefore, be described as constructed and arranged to establish and control two circuits for the purpose described, although it may be used to change a resistance in series with any type of device after a predetermined time, or used as a starter for starting and operating a fluorescent lamp or other space discharge device, or performing other similar or analogous control actions. In other words, the relay is not limited to any of these uses, but may be used to perform any circuit or instrument control functions for which it is adapted.

Referring to the diagrammatic showing of the starting and operating circuits and relay in Figs. 8–11, inclusive, and to the constructional showing of the relay in Figs. 1–7, inclusive, 5 designates a supply lead from the line terminal B, through a line switch L, to the starter terminal 1, and 6 is lead between the relay terminal 2 and the intake end of a return conductor 7 in which the contactor coil Co.C is arranged and which continues from the output end of the coil to the relay terminal 3. 8 designates a return lead between the relay terminal 4 and line terminal W, through line switch L. 9 designates a conductor extending from the lead 5 at a point between the terminals B and 1 to the input end of a current controlling resistance R, the opposite end of which is connected to return conductor 7 and thence to contactor coil Co.C. These parts form the external portions of the two circuits containing the contactor coil and the resistance which are controlled in the manner described by the relay.

The relay unit TER comprises in addition to the parts before described, a thermostatic switch S consisting of two normally closed main switch members $S^1$, $S^2$ and an auxiliary or stop member $S^3$. These switch members are formed of elongated bimetallic strips or reeds and the switch member $S^1$, $S^2$ are arranged in V-formation (Fig. 2) and normally in contact at one end, the other ends of the strips $S^1$, $S^2$ being fastened to the upright A" by fastening terminals $S^{1'}$, $S^{2'}$. The stop member $S^3$ is shorter than and arranged behind (or below) the switch member $S^1$ and is fastened at one end with the latter by the same fastener terminal $S^{1'}$ (Fig. 6) to the upright A", and said member extends toward its free end at a diagonal angle to and in spaced relation to the member $S^1$ in the direction of opening movement of the latter. At their free ends the switch members $S^1$, $S^2$ are provided with contacts $S^{1''}$, $S^4$ normally held in contact by the resiliency and preadjusted pressure of the switch members.

Mounted on the upright A" at one side thereof by a conducting bracket $A^2$ is an electromagnetic coil C (Fig. 3) having a core $A^6$ projecting through and exposed at the opposite side of the upright A". The bracket $A^2$ also extends through the upright and is bent upward to form a stop $A^3$. Pivotally mounted at one end on this end portion of the bracket is an armature or movable electromagnetic switch member $S^5$ normally held open and in engagement with the stop $A^3$ and with a stationary contact member $S^6$ by a spring $A^5$, and adapted to be moved into engagement with the end of the core $A^6$ by the electromagnetic attraction of the coil when the coil is energized. Member $S^6$ is fastened at one end of the upright A" by a fastener terminal $S^7$. Carried by the armature or switch member $S^5$ is a mechanical interlocking connection MIC shown in the present instance as an insulated arm having a free end portion arranged to engage the switch member $S^2$ and hold it open and out of contact with switch member $S^1$ as long as the coil is energized, and the switch $S^2$, $S^1$ is held open thereby and until the supply of current from the source is cut off. The switch members $S^5$, $S^6$ are provided with contact terminals $S^8$, $S^9$. These contact terminals as well as those of the switch elements above referred to, may be made of some corrosion proof metal to ensure good contact at all times.

Conducting connections are provided between the relay terminals and working parts of the relay consisting of a conductor 5' leading from the terminal 1 to terminal $S^{10}$, conductors 10 and 10' leading from terminal 2 to terminal $S^7$ and containing a heater H for the thermostatic switch, a conductor 11 connecting terminal 3 with the terminal $S^{1'}$ and with a conductor 12 serially connecting conductor 11 and the coil C with the terminal 4, and a conductor 13 connecting the terminal $S^{2'}$ with the terminal 4 at a point between said terminal 4 and the coil. A condenser C' is connected across the conductors 5' and 10' and consequently across the switches $S^5$, $S^6$ to suppress arcing at the switch contacts.

The arrangement described provides a normally closed first or starting circuit consisting of (from B) elements 5, 1, 5', $S^5$, $S^6$, 10', H, 10, 2, C, Co.C, 7, 3, 11, $S^1$, $S^2$, 13, 4, 8 and W, excluding coil C which is shunted by the switch S and its connections which extend across it, and a second operating or running circuit consisting of (from B) the elements 5, 9, R, Co.C, 7, 3, 11, 12, C, 4 and 8 to W, said second circuit being established when the time delay switch S opens and breaks the shunt about the coil C which is thereby energized and opens the switch $S^5$ to break the first circuit and insert the resistance into series connection with the contactor coil for a running action which will continue as long as the line circuit remains closed.

The operation will be understood from the foregoing description, it being understood that in a starting operation, when the line circuit is closed, for example by closing the line switch L, line voltage will be supplied through the first circuit to the contactor coil for a definite period of time (selected to be enough to insure operation of the contactor Co) until the time delay switch S opens and causes the coil C to be energized. Coil C when energized will cause switch $S^5$ to open and break the starting circuit and establish the operating circuit, which connects the resistance R into series connection with the contactor coil Co.C for a running action and the operating circuit will be maintained as long as current from the line is supplied, as coil C will hold switch $S^5$ open, and switch $S^5$ through the mechanical interlocking connection MIC will hold switch $S^2$ open and prevent it from reclosing and reestablishing the starting circuit. This action will allow the thermostatic switch S to cool off, ready to reclose to re-establish the starting circuit for a practically instantaneous restarting action again in the event that the line current is accidentally or otherwise cut off and it is desired to restart the apparatus again.

Figure 1:
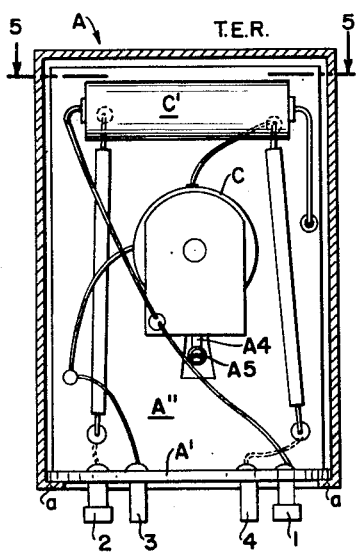
Figure 2:
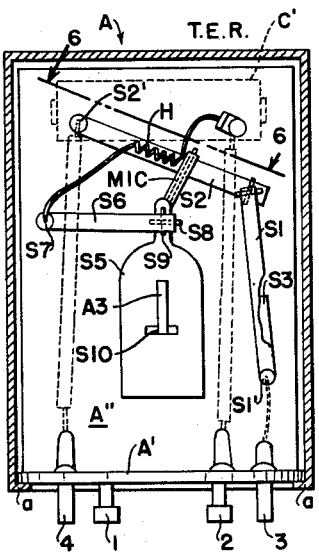
Figure 3:
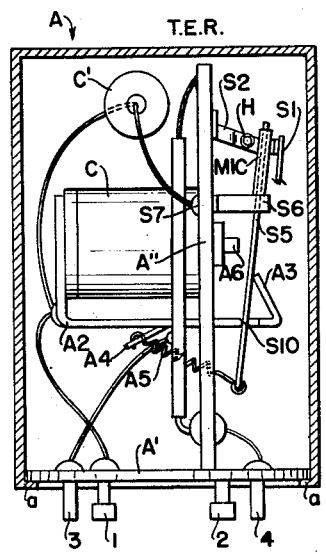
Figure 4:
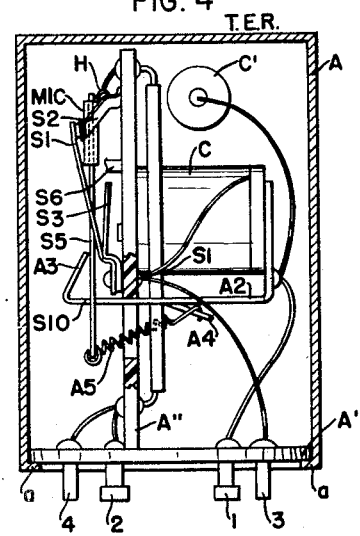
Figure 5:
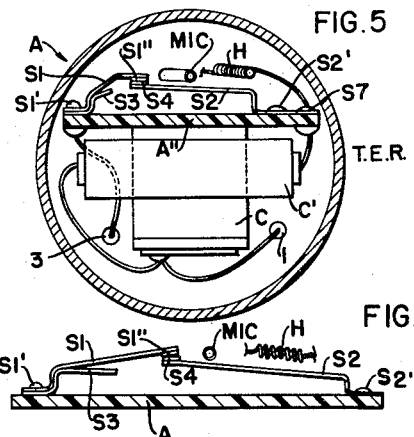
Fig. 5 is a horizontal transverse section on line 5—5 of Fig. 1.
Figure 6:
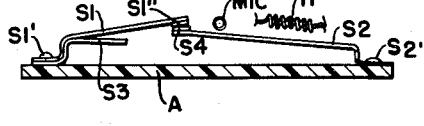
Figs. 6 and 7 are sections on the line 6—6 of Fig. 2 showing different positions of parts of the thermal switch.
Figure 7:
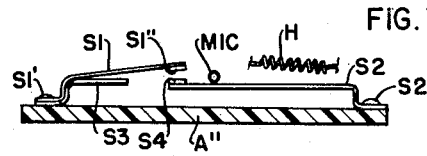
Figure 8:
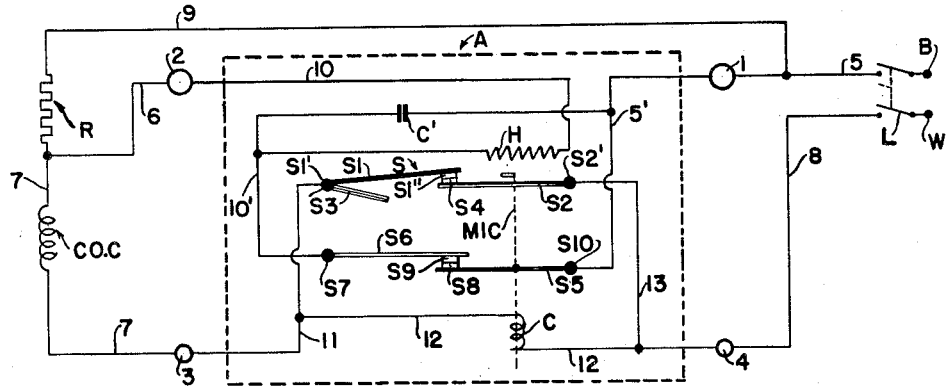
Fig. 8 is a diagrammatic view of the relay as arranged to control a circuit, showing the switch parts of the relay in normal position or with current off.
Figure 9:
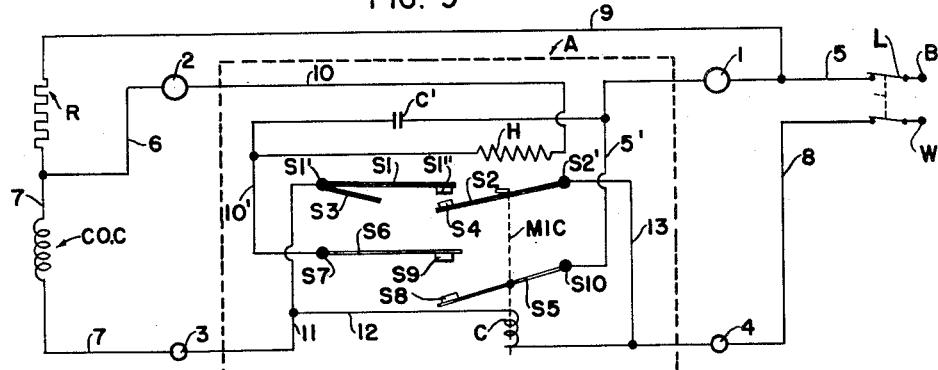
Fig. 9 is a similar view showing the relay switch parts in position assumed after it has operated at ambient temperatures of approximately 140° F.
Figure 10:
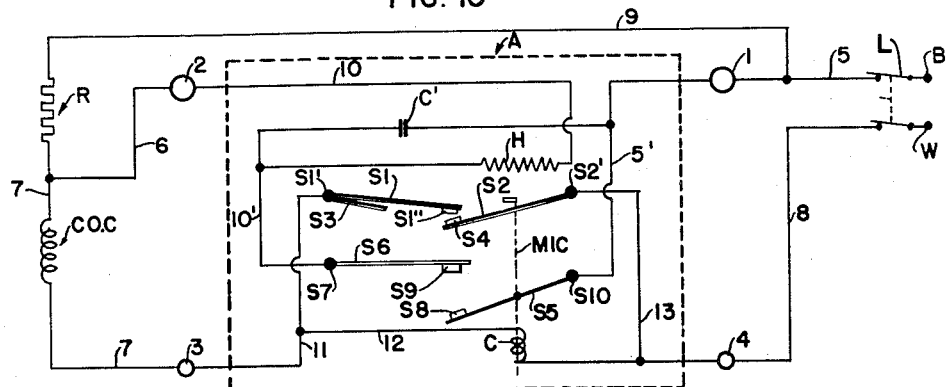
Fig. 10 is a similar view showing the relay switch parts in position assumed after it has operated at ambient temperatures of more than 140° F.

The operation of the relay in automatically adjusting itself to compensate for ambient temperature changes and to secure a proper time delay starting operation throughout a wide range of ambient temperature changes will be readily understood by reference to the diagrammatic showings in Figs. 8 to 14, inclusive, of the drawings, and particularly Figs. 11 to 14 thereof. Fig. 8 may be regarded as showing the thermal switch members in the positions assumed with current off, Fig. 9 the positions assumed by said switch members after operation at ambient temperatures of 140° F. and less, Fig. 10, the positions assumed by said switch members after operation at ambient temperatures of more than 140° F. This degree factor of 140° F. is merely an arbitrary designation selected to explain the movements performed, although by proper design the switch members may be adapted to operate at any desired ambient temperatures relative to a basic temperature.

Figure 11:
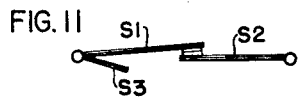
Fig. 11 is a detail view showing the main thermal reeds in contact in positions assumed at low ambient temperatures.
Figure 13:
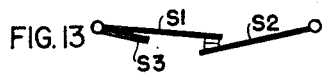
Fig. 13 is a detail view showing the main thermal reeds in contact in positions assumed at high ambient temperatures.
Figure 12:
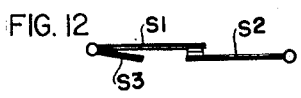
Fig. 12 is a detail view showing the main thermal reeds in contact in positions assumed at medium ambient temperatures.

Figs. 11 to 14 more particularly show the relative movements of the switch members $S^1$, $S^2$, $S^3$ throughout ambient temperatures ranges from a normal position before they break connection, Fig. 11 showing the normal position of the switch members $S^1$, $S^2$, or their contact position assumed at low ambient temperatures, Fig. 12 the position of said switch members in contact at medium ambient temperatures, Fig. 13 the contact positions of said switch members at high ambient temperatures, Figs. 11, 12 and 13 showing the positions assumed before heat is applied to heater H. Fig. 14 shows the relative movements of switch members $S^1$, $S^2$ and $S^3$ with increasing ambient temperatures, showing that the gap between the switch members $S^1$, $S^3$ gets less as the ambient temperature progressively increases.

It is to be understood that in the compensating actions above described switch members $S^1$, $S^2$, bend in the same direction and remain in contact with each other at ambient temperatures up to the predetermined ambient maximum and until switch S² is heated to the predetermined breaking temperature by the heater H. Normally the switch members S¹, S² are temperature compensated up to the circuit breaking point so that in a normal starting action the heater H will cause switch member S², over which it is directly located, to break connection with switch member S¹. If after this occurs the ambient temperature is increased within the relay TER for any reason, switch member S³, which moves reversely to switch members S¹ and S², moves toward and in the path of switch member S¹ to act as a stop to prevent it (member S¹) from moving further and contacting switch member S².

Thus the travel of the switch S¹ will be limited to an amount such that it cannot reestablish contact with switch S² after the contact has once been broken, and such that the operation of the magnetic armature in combination with said switch members can produce an open circuit between the switch members S¹, S² at any ambient temperature. When this circuit, which shunts the relay coil C is broken, the relay armature S⁵ acts to hold said switch members S¹, S² open and simultaneously produce a rapid break of the magnetic contacts. By applying the reversed thermal action of switch member S³ to switch member S¹, control of the switch members S¹, S² up to approximately 200° F. can be effected, if desired. It is evident from the foregoing that the switch members S¹, S² can be ambient temperature controlled against operation (opening) up to any desired temperature point, but that once having operated, said switch members will be held from reclosing under any higher ambient temperature present while the contactor coil or other controlled device is operating.

This characteristic feature of the thermostatic switch will be found of material advantage in various circuits, such as fluorescent lamp circuits, etc., where the ambient temperatures rise considerably after the lamp has started. In practice the mechanical interlocking device can be designed to hold switch member S² out of contact with switch member S¹ at high ambient temperatures, at which temperatures any attempt of switch member S¹ to follow down and touch switch member S² will be resisted by the reverse pressure of the switch member S³.

From the foregoing description, taken in connection with the drawings, the construction, mode of operation and advantages of our improved thermo-electric relay will, it is thought, be readily understood and appreciated by those versed in the art without a further and extended description. While the construction of the relay as shown is preferred it will, of course, be understood, that it may be varied within the scope of the appended claims without departing from the spirit or sacrificing any of the advantages of the invention.

Having thus described our invention, we claim:

1. A circuit controlling relay having thermally responsive circuit making and breaking means including two thermostatic switch members normally in contact, a heater therefor to cause one of said switch members to flex and break contact with said other switch member within a predetermined period of time, said switch members, responsive to varying ambient temperature being conjointly movable in the same direction to different relative positions without breaking contact, and a third thermostatic member mounted to flex at a predetermined higher ambient temperature in the direction opposite to the flexing movement of one of said switch members, said third member being mounted to engage and restrain the flexing movement of said switch member so as to prevent the recontacting of said switch members after contact has been broken by the action of said heater.

2. A circuit controlling relay having thermally responsive circuit making and breaking means including two main bimetallic reeds, means for mounting each of said reeds at one end for flexing movement, the free ends of said reeds being normally in contact, a heater therefor to cause one of said reeds to flex and break contact with said other reed within a predetermined period of time, said reeds, responsive to different ambient temperatures acting thereon, being conjointly movable in the same direction to different relative positions without breaking contact, and a third bimetallic reed, one end thereof being mounted in engagement with the fixed end of one of said main reeds, said reeds flexing in opposite directions, the free end of said third reed projecting in a common plane with and at an angle to said main reed so that the flexing of said main reed is restrained to an increasing degree as the ambient temperature increases.

References Cited in the file of this patent

UNITED STATES PATENTS

| | | |
|---|---|---|
| 1,916,671 | Hanser et al. | July 4, 1933 |
| 2,069,625 | Rich | Feb. 2, 1937 |
| 2,189,996 | Riche | Feb. 13, 1940 |
| 2,282,986 | Wood | May 12, 1942 |
| 2,302,603 | Davis et al. | Nov. 17, 1942 |
| 2,303,165 | Johnson | Nov. 24, 1942 |
| 2,621,236 | Mason | Dec. 9, 1952 |